United States Patent Office 3,436,380
Patented Apr. 1, 1969

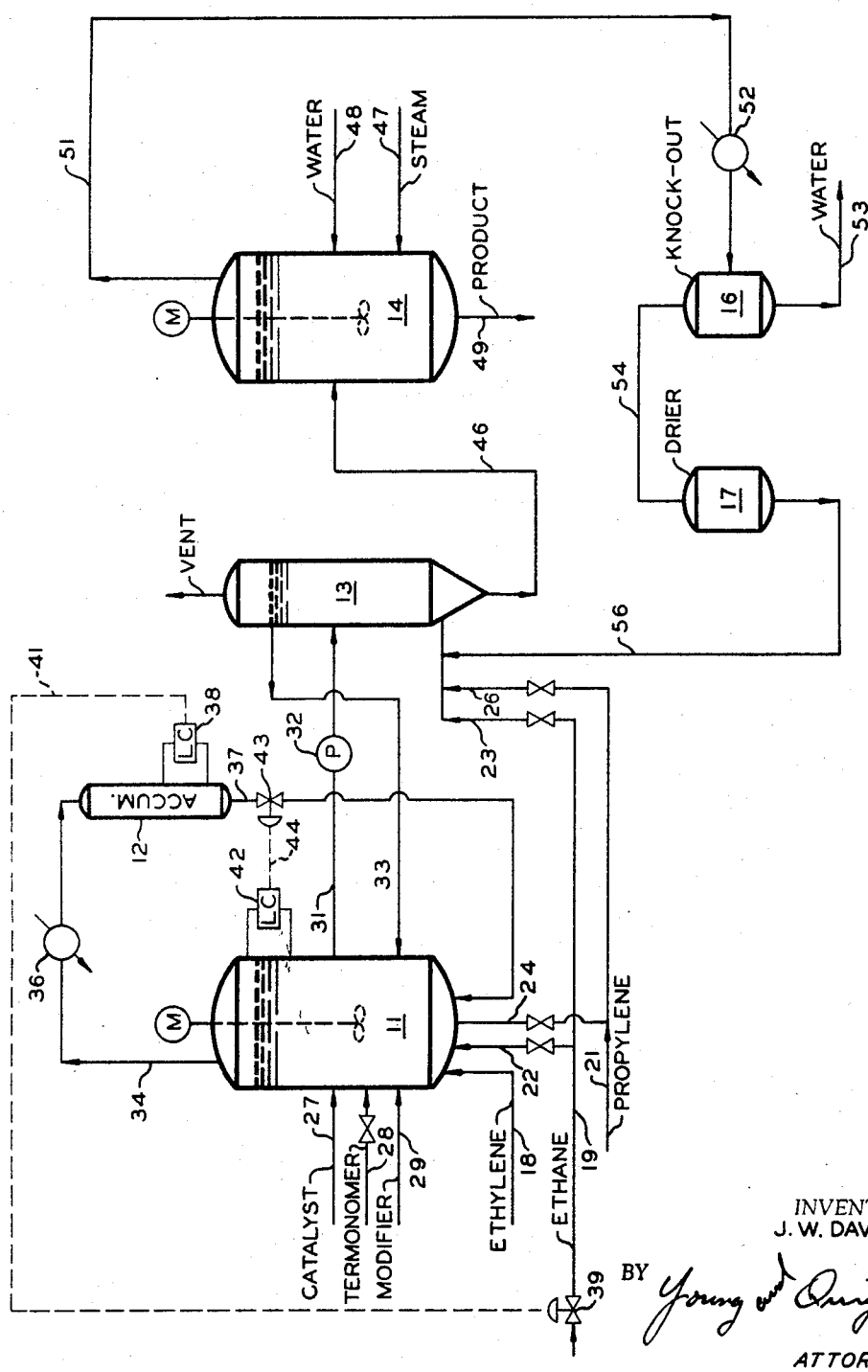

3,436,380
POLYMERIZATION AND RECOVERY OF OLEFIN POLYMERS
Joseph W. Davison, Bartlesville, Okla., assignor to Phillips Petroleum Company, a corporation of Delaware
Filed Nov. 12, 1964, Ser. No. 410,426
Int. Cl. C08f *1/42, 1/88, 1/06*
U.S. Cl. 260—80.78       8 Claims

ABSTRACT OF THE DISCLOSURE

A slurry process for polymerizing mixtures of olefins with a coordination catalyst wherein either one of the monomers or the low molecular weight hydrocarbon diluent used to control the polymerization reaction is used as the wash liquid to remove catalyst residue and unreacted monomers from the polymer slurry and the wash liquid containing catalyst and unreacted monomers is recycled to the reaction zone.

---

This invention relates to the polymerization and recovery of olefin polymers. In one aspect, it relates to a slurry type polymerization process for production of olefin polymers. In another aspect, it relates to a process of copolymerizing ethylene and propylene, with or without a third monomer.

It is known that copolymers of 1-monoolefins, such as ethylene and propylene, can be prepared with an organometallic type catalyst, frequently referred to as a coordination catalyst. Currently, of considerable interest, are amorphous polymers of olefins such as ethylene and propylene having elastomeric properties. It is also known that monomers, such as ethylene and propylene, can be polymerized under conditions such that the polymer product is obtained as a slurry in the hydrocarbon diluent employed as the reaction medium.

The following are objects of this invention.

An object of this invention is to provide an improved process for the polymerization and recovery of olefin polymers. A further object of the invention is to provide a slurry process in which ethylene and propylene, with or without a third monomer, are polymerized in a slurry process in which an improved process of polymer recovery and purification is used. A further object of this invention is to provide such a slurry polymerization process wherein improved temperature and pressure control of the reaction zone is obtained.

Other objects and advantages of this invention will be apparent to one skilled in the art upon reading this disclosure which includes A drawing showing, in schematic form, apparatus suitable for carrying out the process of my invention.

The present invention is concerned with a process for polymerizing a mixture of monoolefins under conditions such that the polymer products are obtained as a slurry in the reaction medium. The invention is also concerned with an improved washing process including the step of using one of the materials supplied to the reaction zone as the washing medium. Also, the invention provides a novel method of controlling pressure and temperature conditions in the reaction zone.

Thus, the invention resides in a process comprising polymerizing a mixture of at least two 1-monoolefins with a polymerization coordination catalyst in the presence of a low molecular weight saturated hydrocarbon and under conditions such that a slurry of solid polymer in hydrocarbon diluent is formed in a reaction zone, the steps comprising, introducing one of the olefins to said reaction zone, passing slurry from said reaction zone to a wash zone, countercurently washing slurry in said wash zone with a second olefin being polymerized to remove catalyst and unreacted olefins therefrom, passing the resulting stream of catalyst and unreacted olefins to said reaction zone, passing washed polymer slurry to a steam stripping zone wherein low molecular weight hydrocarbons are stripped from said polymer producing a water slurry of said polymer, removing an overhead vapor stream from the upper portion of said reaction zone, cooling said overhead stream to condense the same, pasing the condensed overhead stream to an accumulation zone, controlling feed of said low molecular weight saturated hydrocarbon fed to said reaction zone in response to changes of liquid level in said accuculation zone to maintain a constant amount of low molecular weight hydrocarbon in the system to maintain the desired boiling point in the reaction zone, recycling liquid from said accumulation zone to said reaction zone, and controlling flow of said recycle stream to maintain a constant liquid level in said reaction zone.

The invention can probably best be understood by first considering the drawing which is provided to illustrate the process. The important pieces of apparatus used in the process of the invention include a reaction zone 11, an accumulation zone 12, a washing zone 13, a steam stripping zone 14, a knockout zone 16, and a dryer 17. Both reaction zone 11 and steam stripping zone 14 are provided with agitation means. The primary feed conduits to the system include ethylene supply conduit 18, ethane supply conduit 19, and propylene supply conduit 21. Ethylene supply conduit preferably extends directly to the reactor. Valved conduits 22 and 23, communicating with conduit 19, are provided so that ethane or other low molecular weight nonreactive hydrocarbon can be supplied to reaction zone 11 or to wash zone 13. Valved conduits 24 and 26 are communicate with propylene supply conduit 21 and permit supplying propylene directly to reaction zone 11 or to wash zone 13. Reaction zone 11 is also supplied with additional inlet conduits. One of these, designated as conduit 27, is provided to supply catalyst to the reaction zone. While I have shown one conduit 27, it is sometimes desirable to supply the separate ingredients of a multicomponent catalyst in separate streams. In other cases, it is desirable to mix these ingredients prior to introduction into the reaction zone. Conduit 28 is provided to supply a termonomer to the reaction zone, the function of the termonomer being more fully explained hereinafter. Conduit 29 is provided to supply a modifier to reaction zone 11, the function of and examples of suitable modifiers also being more fully described hereinafter. Conduit 31, provided with pump 32, communicates with reaction zone 11 and wash zone 13 and is provided to transfer slurry from reaction zone 11 to wash zone 13. Conduit 31 communicates with an intermediate portion of wash zone 13. Also extending between and communicating with reaction zone 11 and wash zone 13 is conduit 33 which serves to transfer liquid from wash zone 13 to reaction zone 11.

Conduit 34, having condenser 36 therein, communicates with the vapor space of reaction zone 11 and the inlet to accumulation zone 12. Conduit 37 extends from the liquid removal outlet of accumulation zone 12 to the lower end portion of reaction zone 11.

Two liquid level controls are provided in the system including reaction zone 11. These include level controller 38 operatively connected to accumulation zone 12 and valve 39 in conduit 19 by means of line 41. Level controller 42 measures the liquid level in reaction zone 11 and is operatively connected to valve 43 by means of line 44.

Extending from the lower end portion of wash zone 13 is conduit 46 which extends to an intermediate portion of stripping zone 14. Steam and water are supplied to stripping zone 14 by means of conduits 47 and 48, respectively. The product is removed from the lower end portion of stripping zone 14 through conduit 49. Extending from the vapor section of stripping zone 14 is conduit 51, this conduit having condenser 52 therein and extending to knockout zone 16. Water removal conduit 53 and hydrocarbon removal conduit 54 extend from knockout zone 16. Conduit 54 communicates with dryer 17 and the outlet from dryer 17, conduit 56, extends to the inlet of wash zone 13.

In the operation of this system, the monomers are polymerized under conditions to provide a slurry of polymer in reaction zone 11. In the specific modification shown in the drawing, one of ethane or propylene is fed with the ethylene directly to the reaction zone. The other of these materials is used as the wash liquid. The slurry from the reaction zone is passed to wash zone 13 wherein it is washed countercurrently with the wash liquid supplied to the lower end portion of the zone. The wash zone liquid effluent, containing unreacted monomer, the nonreactive hydrocarbon, and catalyst is returned to the reaction zone 11 through conduit 33. Thus, all of the nonreactive hydrocarbon, the ethane in this example, or the propylene, is used as the wash liquid in the system. A slurry of the polymer in the mixed hydrocarbon stream is then passed to the steam stripping zone wherein the remaining catalyst and low molecular weight hydrocarbons are stripped from the polymer producing an aqueous slurry thereof. This material, removed by conduit 49, is then ready for further processing steps.

The vapor mixture obtained from the upper end portion of stripping zone 14 then passes to knockout zone 16 wherein separate water (53) and hydrocarbon (54) streams are obtained. The hydrocarbon stream, after drying, is returned to the wash zone. The water can be discarded or all or a part thereof returned to steam stripping zone 14.

One feature of my invention includes the reaction zone 12 control which is based upon the use of ethane to control the physical conditions (temperature and pressure) so that the desired boiling point or bubble point is maintained therein. Such condition should be maintained constant so that a polymer product of consistent properties is produced. Level controller 38 measures the level in accumulation zone 12 and serves to control total ethane content in the system. This provides for supplying make-up ethane for that used in the process. Level controller 42 maintains a constant level in the reaction zone by controlling recycle of liquid materials from accumulation zone 12 to reaction zone 11. By control of this recycle stream, a constant liquid level is maintained in the reaction zone.

The present invention is particularly applicable to the copolymerization of ethylene and propylene. However, other mixtures of 1-monoolefins can also be polymerized, particularly mixtures of ethylene and 1-monoolefins represented by the general formula $CH_2=CHR$, where R is an alkyl radical containing from 1 to 6 carbon atoms. In addition to propylene, examples of suitable 1-monoolefins represented by this formula include 1-butene, 1-pentene, 1-hexene, 1-octene, 3-methyl-1-butene, 3-methyl-1-pentene, 3-methyl-1-hexene, 4-ethyl-1-hexene, 4,4-dimethyl-1-pentene, 3,3-dimethyl-1-butene, 5-methyl-1-hexene, 5-methyl-1-heptene, 4-methyl-1-heptene, 4,4-dimethyl-1-hexene, 6-methyl-1-heptene, 3,4,4-trimethyl-1-pentene, and the like.

The present invention is also applicable to the preparation of terpolymers of 1-monoolefins, such as ethylene and propylene, and a third monomer. The third monomer introduces unsaturation into the polymer chain and renders the product sulfur vulcanizable. Examples of suitable termonomers include dicyclopentadiene; ethynyl ethylenes, such as vinylacetylene, isopropenylacetylene, and 2-ethyl-1-buten-3-yne; certain of the fulvene class of compounds such as fulvene itself, 6,6-dimethylfulvene, 6,6-diethylfulvene; acyclic nonconjugated dienes, such as 1,4-pentadiene, 1,5-hexadiene, 2-methyl-1,5-hexadiene, 3,3-dimethyl-1,5-hexadiene, 1,7-octadiene, 1,9-decadiene, 6-methyl-1,5-heptadiene, 11-ethyl-1-,11-tridecadiene; acetylenes, such as acetylene, vinylacetylene, isopropylacetylene; norbornene; and the like.

The relative amounts of the comonomers contained in the copolymer products of this invention can vary over a very wide range. In the case where ethylene and another 1-monoolefin, such as propylene, are copolymerized, the copolymer usually comprises from 20 to 75 weight percent ethylene and from 20 to 75 weight percent proylene. When a termonomer is employed, it will generally make up from 0.5 to 20, preferably 1 to 10, weight percent of the polymer. The amount of the modifier employed in the polymerization is generally in the range of 5 to 500 millimoles per 100 grams of propylene or other comonomer used with ethylene.

It is also frequently desirable to use a modifier in the polymerization. Such modifiers do not appear to enter into the polymer product but reduce the problem of agglomeration of polymer particles as they are produced. Such agglomeration interferes with contact between the monomers and the catalyst.

Compounds that are suitable for use as modifiers in the practice of the present invention include both conjugated and nonconjugated dienes. Examples of these compounds include 1,3-butadiene, isoprene, chloroprene, 3-vinyl-1-cyclohexene, 4-vinyl-1-cyclohexene, dipentene and 2,7-dimethyl-1,7-octadiene. The modifiers at the most are incorporated into the polymer structure only in trace amounts. As evidenced by a decrease in inherent viscosity of the products prepared in their presence, the modifiers function to control the molecular weight of the polymer product and provide a means for preparing stable polymer slurries of higher solids content than are otherwise obtainable. It is usually preferred to employ 1,3-butadiene in the preparation of the copolymers and terpolymers. The other modifiers are particularly useful in preparing copolymers although they can also be employed in the preparation of terpolymers. In addition to the other advantages mentioned, the modifiers, particularly 1,3-butadiene, function to control the propylene content of the ethylene-propylene copolymers and terpolymers, i.e., the propylene content can be maintained at a lower level than is normally obtained when the modifier is absent.

The present process is conducted at a temperature below about $-60°$ F. The low temperature insures the formation of the polymer product as a slurry. It is usually not desirable to operate at a temperature below $-310°$ F. in view of the slower reaction rates as the temperature is reduced. The polymerization is generally carried out at a pressure such that the larger proportion of the materials present are in the liquid phase but at the boiling point of the reaction mixture. Obviously, the pressure selected depends upon a number of factors including the composition of the mixture in the reaction zone and the temperature at which the polymerization is conducted. However, the range of 20 to 100 p.s.i.a. is generally used.

The particular catalyst used is one of the type which has become known as a coordination type catalyst. These generally include at least one reducing compound of a metal of Groups I, II, III, IV–A and V–A and at least one compound of a reducible polyvalent transition metal of Groups IV–B, V–B, VI–B, VII–B, and VIII, according to the chart shown on pages 448–449 of the 43rd edition of "Handbook of Chemistry and Physics," copyright 1961, The Chemical Rubber Publishing Co. Such catalysts have been extensively explored by others in this field and the term "coordination catalyst" identifies such catalysts to those skilled in the art. For additional information and specific examples, reference is made to "Linear and Stereoregular Addition Polymers" by Gaylord and Mark, copyright 1959 by Interscience Publishers, Inc. Chapter VII is particularly pertinent.

Also present during the polymerization is a low molecular weight non-reactive hydrocarbon. Reference has been made to ethane as an example of this material.

other suitable compounds include the lower molecular weight aliphatic hydrocarbons such as propane, the butanes, the pentanes, the hexanes, and aromatic compounds such as benzene and toluene. The selection of the particular non-reactive hydrocarbon will depend upon the conditions desired in the reaction zone. In general, the lower molecular weight materials in the group are referred as the polymerization temperature is reduced.

The polymerization process of this invention is conducted in the absence of materials which may have a deleterious effect on the catalyst. These materials include oxygen, carbondioxide, and water. It is usually desirable that the monomers be substantially free from these materials as well as from other materials which may tend to inactivate the catalyst before contacting the monomers with the catalyst.

It is also desirable that air and moisture be removed from the reaction vessel before the reaction is carried out.

The following example illustrates a specific embodiment of the process but it should not be considered unduly limiting.

EXAMPLE

This example illustrates the operation of the system of my invention as it is shown in the drawing. Suitable operation is obtained when the reaction zone is maintained at −85° F. and 40 p.s.i.a. while the steam stripping zone is operated at 90° F and 15 p.s.i.a. The catalyst is a mixture of ethylaluminum sesquichloride and vanadium tetrachloride. Dicyclopentadiene is used as the termonomer and butadiene is used as a modifier. The ethane and ethylene are supplied directly to the polymerization zone and all of the make-up propylene is supplied to the lower end portion of the wash column.

A material balance, where the amounts are given in pounds per stream day is shown in the following table:

| Stream | Makeup Propylene | Makeup Ethylene | Makeup Dicyclo Penta-diene | Makeup Buta-diene | Make-up Ethane | Make-up VCl$_4$ | Make-up EASC | Reactor Vapor Effluent | Reactor Slurry Effluent | Wash Column Overhead | Stripper Feed | Stripper Bottoms | Hydrocarbon Recycle |
|---|---|---|---|---|---|---|---|---|---|---|---|---|---|
|  | 21 | 18 | 28 | 29 | 19 | 27 | 27 | 34 | 31 | 33 | 46 | 49 | 56 |
| Propylene | 53,900 |  |  |  |  |  |  | 44,000 | 127,000 | 168,800 | 67,900 |  | 67,900 |
| Ethylene |  | 80,500 |  |  |  |  |  | 44,000 | 8,400 | 49,200 | 1,000 |  | 1,000 |
| Dicyclopentadiene |  |  | 7,100 |  |  |  |  |  | 27,200 | 26,900 | 300 | 300 | 0 |
| Butadiene |  |  |  | 300 |  |  |  |  | 6,800 | 6,000 | 800 | 300 | 500 |
| Ethane |  |  |  |  | 13,600 |  |  | 1,482,000 | 598,800 | 2,067,200 | 66,900 |  |  |
| VCl$_4$ |  |  |  |  |  | 170 |  |  | 678 | 508 | 170 | 170 |  |
| EASC |  |  |  |  |  |  | 1,190 |  | 4,740 | 3,550 | 1,190 | 1,190 |  |
| Water |  |  |  |  |  |  |  |  |  |  |  | 100,000 |  |
| Polymer |  |  |  |  |  |  |  |  | 135,800 |  | 135,800 | 135,800 |  |

As many possible embodiments can be made of this invention without departing from the scope thereof, it is to be understood that all matter herein set forth is to be interpreted as illustrative and not as unduly limiting the invention.

That which is claimed is:

1. In a process comprising polymerizing a mixture of at least two 1-monoolefins in a reaction zone with a polymerization catalyst in the presence of a low molecular weight, nonreactive hydrocarbon which acts to maintain the reaction mixture at a desired boiling point, said polymerization being performed under conditions such that a slurry of solid polymer is formed in said reaction zone, the improvement comprising the steps:

(a) A introducing monomer comprising at least one of said 1-monoolefins and the catalyst into said reaction zones;

(b) introducing one of (1) said low molecular weight, non-reactive hydrocarbon and (2) one of said 1-monoolefin other than that introduced into step (a) into said reaction zone;

(c) passing said slurry from said reaction zone to a wash zone;

(d) introducing, into said wash zone, a wash liquid comprising the hydrocarbon of step (b) not introduced into said reaction zone and countercurrently washing said slurry with said wash liquid therein to separate at least a portion of the catalyst and unreacted olefins from said slurry;

(e) passing the resulting wash zone effluent containing catalyst and unreacted olefins from said wash zone to said reaction zone;

(f) separating any remaining unreacted olefin, low molecular weight hydrocarbon, and a further portion of the catalyst from the washed polymer slurry;

(g) recovering a polymer slurry;

(h) removing an overhead vapor stream from the upper portion of said reaction zone and cooling said overhead stream to condense same;

(i) passing the condensed overhead stream to an accumulation zone;

(j) controlling feed of said low molecular weight, non-reactive hydrocarbon in response to changes of liquid level in said accumulation zone to maintain a constant amount thereof in the system so as to maintain a desired boiling point in said reaction zone;

(k) recycling liquid from said accumulation zone to said reaction zone; and (l) controlling flow of said recycled stream so as to maintain a constant liquid level in said reaction zone.

2. The process according to claim 1 wherein the monomer introduced in step (a) is ethylene.

3. The process according to claim 2 wherein the hydrocarbon introduced in step (b) is propylene and the hydrocarbon introduced in step (d) is ethane.

4. The process according to claim 2 wherein the hydrocarbon introduced in step (b) is ethane and the hydrocarbon introduced in step (d) is propylene.

5. In a process wherein ethylene, propylene, and a non-conjugated diolefin are polymerized with a catalyst which forms on mixing (1) at least one reducing compound of the metals of Groups I, II, III, IV–A and V–A and (2) at least one compound of a reducible polyvalent transition metal of Groups IV–B, V–B, VI–B, VII–B, and VIII in a reaction zone in the presence of a low molecular, non-reactive hydrocarbon used to maintain the polymerization temperature at −310 to −60° F. and the polymerization pressure at 20 to 100 p.s.i.a. so as to form a liquid slurry of a terpolymer of the olefins, the improvement comprising the steps:

(a) introducing the catalyst, non-conjugated diolefin and ethylene into said reaction zone;

(b) introducing one of (1) propylene and (2) low molecular weight, nonreactive hydrocarbon directly into said reaction zone;

(c) passing said slurry from said reaction zone to a wash zone;

(d) introducing, into said wash zone, a wash liquid comprising the hydrocarbon of step (b) not introduced into said reaction zone and countercurrently washing said slurry with said wash liquid therein to separate at least a portion of the catalyst and unreacted olefins from said slurry;
(e) passing the resulting wash zone effluent containing catalyst and unreacted olefins from said wash zone to said reaction zone;
(f) separating any remaining unreacted olefin, low molecular weight hydrocarbon, and a further portion of the catalyst from the washed terpolymer slurry;
(g) recovering a terpolymer slurry;
(h) removing an overhead vapor stream containing propylene, ethylene, and low molecular weight, nonreactive hydrocarbon from the upper portion of said reaction zone;
(i) compressing and cooling said overhead stream to condense same;
(j) passing the condensed overhead stream to an accumulation zone;
(k) controlling feed of low molecular weight, nonreactive hydrocarbon in response to changes of liquid level in said accumulation zone to maintain a constant amount thereof in the system so as to maintain a desired boiling point in said reaction zone;
(l) recycling liquid from said accumulation zone to said reaction zone; and
(m) controlling flow of said recycled stream to maintain a constant liquid level in said reaction zone.

6. The process of claim 5 wherein said nonconugated diolefin is dicyclopentadiene, said catalyst is an ethylaluminum sesquichloridevanadium tetrachloride catalyst, and said low molecular weight, nonreactive hydrocarbon is ethane.

7. The process of claim 6 wherein makeup ethane and ethylene are fed directly to the reaction zone and makeup propylene is fed to said wash zone.

8. The process of claim 6 wherein makeup ethylene and propylene are fed directly to the reaction zone and makeup ethane is fed to said wash zone.

References Cited

UNITED STATES PATENTS

| | | | |
|---|---|---|---|
| 2,484,384 | 10/1949 | Levine et al. | 260—92.8 |
| 3,108,094 | 10/1963 | Morgan | 260—94.9 |
| 3,197,454 | 7/1965 | Plaster | 260—94.9 |
| 3,254,071 | 5/1966 | Morgan et al. | 260—94.9 |
| 3,280,090 | 10/1966 | Scoggin | 260—94.9 |
| 3,291,780 | 12/1966 | Gladding et al. | 260—80.5 |

JOSEPH L. SCHOFER, *Primary Examiner.*

HARRY WONG, JR., *Assistant Examiner.*

U.S. Cl. X.R

260—80.7, 88.2, 94.9